United States Patent
Fujii

(10) Patent No.: US 9,166,497 B2
(45) Date of Patent: Oct. 20, 2015

(54) SWITCHING POWER SOURCE DEVICE WITH DISCHARGE CIRCUIT

(71) Applicant: FUJI ELECTRIC CO., LTD., Kawasaki-shi, Kanagawa-ken (JP)

(72) Inventor: Masanari Fujii, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 129 days.

(21) Appl. No.: 14/021,390

(22) Filed: Sep. 9, 2013

(65) Prior Publication Data
US 2014/0078794 A1    Mar. 20, 2014

(30) Foreign Application Priority Data
Sep. 20, 2012 (JP) ................................ 2012-207644

(51) Int. Cl.
  *H02M 7/516* (2007.01)
  *H02M 7/217* (2006.01)
  *H02M 3/335* (2006.01)
  *H02M 7/517* (2006.01)
  *H02M 1/00* (2007.01)

(52) U.S. Cl.
  CPC .......... *H02M 7/217* (2013.01); *H02M 3/33507* (2013.01); *H02M 2001/0035* (2013.01); *H02M 2001/0041* (2013.01); *Y02B 70/16* (2013.01)

(58) Field of Classification Search
USPC .......... 363/56.01–56.05, 95, 97, 98, 131, 132
See application file for complete search history.

(56) References Cited

U.S. PATENT DOCUMENTS

| | | | | |
|---|---|---|---|---|
| 6,166,925 A * | 12/2000 | Richter et al. | ............. | 363/21.01 |
| 7,495,875 B2 * | 2/2009 | Lin | ................... | 361/89 |
| 7,541,788 B2 * | 6/2009 | Katoh et al. | .................. | 323/282 |
| 7,723,972 B1 * | 5/2010 | Balogh | .......................... | 323/282 |
| 7,746,673 B2 * | 6/2010 | Grant et al. | ................ | 363/21.18 |
| 8,018,743 B2 * | 9/2011 | Wang et al. | ................ | 363/21.18 |
| 8,084,893 B2 * | 12/2011 | Fujii | ............................. | 307/130 |
| 8,184,459 B2 * | 5/2012 | Fujii | ................................ | 363/97 |
| 2008/0024099 A1 * | 1/2008 | Oki et al. | ....................... | 323/282 |
| 2009/0174978 A1 | 7/2009 | Nakamura | | |
| 2011/0051472 A1 * | 3/2011 | Zhang et al. | ................ | 363/21.18 |
| 2011/0316449 A1 * | 12/2011 | Imanaka | ........................ | 315/307 |

* cited by examiner

*Primary Examiner* — Adolf Berhane
*Assistant Examiner* — Nusrat Quddus
(74) *Attorney, Agent, or Firm* — Manabu Kanesaka

(57) ABSTRACT

A switching power source device includes a switching power supply main body switching an input voltage via a switching element to obtain a predetermined DC output voltage, a control circuit performing on/off-driving of the switching element; and a capacitor connected to the control circuit to be charged by an external power supply via an activation switch circuit during activation and charged by a voltage generated in the switching power supply main body after completion of activation to supply a control power voltage to the control circuit. The control circuit further includes a latch circuit set according to a latch signal emitted when an abnormality is detected, to stop the driving of the switching element, a discharge circuit receiving the latch signal to be turned on and discharging charges accumulated in the capacitor, and a comparator resetting the latch circuit when the control power voltage decreases to an operation stop voltage.

5 Claims, 5 Drawing Sheets

SWITCHING POWER SOURCE DEVICE WITH DISCHARGE CIRCUIT

BACKGROUND

1. Technical Field

The present invention relates to a switching power source device capable of shortening the reactivation time during a latch protection operation based on a latch signal that stops the operation of a power source device itself.

2. Related Art

For example, as illustrated in FIG. 3, a switching power source device that switches an input voltage using a switching element such as an insulated gate bipolar transistor (IGBT) or a metal-oxide semiconductor field-effect transistor (MOSFET) to obtain a direct current (DC) output voltage includes a switching power supply main body 10 constituted mainly of a switching element Q and a control circuit 20 that is configured as an integrated circuit, for example, and performs on/off-driving of the switching element Q. The switching power supply main body 10 includes the switching element Q connected in series to an input power supply (not illustrated) through a primary coil Tw1 of a transformer T, for example, and a secondary-side circuit S connected to a secondary coil Tw2 of the transformer T. The secondary-side circuit S includes a rectification circuit that rectifies a voltage generated in the secondary coil S of the transformer T, an output capacitor that smoothes the rectified output to obtain a predetermined DC output voltage, and the like.

The control circuit 20 basically includes a driver circuit 21 that performs on/off-driving of the switching element Q according to a PWM control signal for controlling an ON width of the switching element Q in response to the DC output voltage of the secondary-side circuit S. Although the PWM control signal will not be described in detail in this specification because it is not directly related to the present invention, the PWM control signal is generated in an IC control block 22 that includes an oscillator that determines a switching frequency of the switching element Q and a protection circuit and the like for protecting the switching element Q from an overload, an overcurrent, and the like.

The control circuit 20 includes an activation switch circuit 23 that receives, at its input terminal VH, an input voltage applied to the primary coil Tw1 of the transformer T, for example, during activation of the switching power supply and charges a capacitor C connected to a control power terminal VCC of the control circuit 20. As illustrated in FIG. 4 illustrating an operation timing during activation of the switching power source device, the activation switch circuit 23 is turned on (conductive) during activation to charge the capacitor C until the voltage of the control power terminal VCC reaches an operation start voltage UVLO-on (see Section 1 in FIG. 4).

When the voltage (control power voltage Vcc) of the control power terminal VCC reaches the operation state voltage UVLO-on due to charging of the capacitor C, the IC control block 22 starts operating and the driver circuit 21 is driven under the control of the IC control block 22, and thereby the switching element Q starts a switching operation. After the switching element Q starts the switching operation, a coil voltage occurring in an auxiliary coil Tw3 of the transformer T is applied to the control power terminal VCC through the capacitor C as the control power voltage Vcc, and as a result, the control circuit 20 continues its operation.

When an abnormality such as an overcurrent or an overload is detected and a protection signal is output, the switching operation of the switching element Q is temporarily stopped to protect the switching element Q and the like from the abnormality as illustrated in FIG. 4. Since no voltage is generated in the auxiliary coil Tw2 due to the stopped switching operation of the switching element Q, and no electric power is supplied to the capacitor C, the voltage Vcc of the control power terminal VCC decreases gradually.

In this case, the IC control block 22 turns on/off the activation switch circuit 23 intermittently to charge the capacitor C in order to secure the voltage of the control power terminal VCC (see Section 2 in FIG. 4). By the intermittent charging of the capacitor C in this protection operation period, the control power voltage Vcc is held at a voltage in which the operation function of the IC control block 22 can be maintained without decreasing to an operation stop voltage UVLO-off. The protection operation state continues due to the maintained operation function of the IC control block 22.

After that, when the abnormality factor is eliminated and the protection signal disappears, the control circuit 20 is reactivated, and the switching operation of the switching element Q restarts under the control of the IC control block 22 (see Section 3 in FIG. 4). However, in this case, due to the supply of the driving current to the switching element Q, naturally, the voltage (the control power voltage Vcc) of the capacitor C temporarily decreases. In order to suppress a temporary decrease in control power voltage Vcc as much as possible and to stably secure the voltage equal to or higher than the operation stop voltage UVLO-off, a relatively high-capacity capacitor (for example, approximately 22 µF) is used as the capacitor C.

However, when an abnormality severer than the overload or the overcurrent (for example, an overheat of the switching element Q) is detected, a latch signal is emitted in order to immediately stop the driving of the switching power source device to prevent thermal fracture of the switching element Q. The latch circuit 25 performs a role of forcibly stopping the operation of the driver circuit 21 by being set in response to the latch signal. The protection operation based on such a latch signal continues until the latch circuit 25 is reset and is referred to as a latch protection operation.

As illustrated in FIG. 5 illustrating the operation timing during the latch protection operation, the control power voltage Vcc (the charge voltage of the capacitor C) gradually decreases with the stopped driving of the switching element Q. When the control power voltage Vcc decreases to the operation stop voltage UVLO-off, a comparator 24 detects this state to reset the latch circuit 25 thereby reactivating the control circuit 20. The time required for securing the control power voltage Vcc after the latch protection operation is performed is referred to as a reactivation time (power reactivation time) from the latch protection operation, and it is generally preferable to secure the voltage in a very short time (for example, in 2 seconds).

As a method of shortening the reactivation time in a protection operation based on the overvoltage detection, a method of releasing an overvoltage operation inhibiting signal when an input voltage becomes smaller than a predetermined threshold voltage is proposed (for example, see JP 2009-165288 A).

SUMMARY

Problem to be Solved by the Invention

The method disclosed in JP 2009-165288 A is effective in the overvoltage protection operation but is not effective in the latch protection operation described above. Thus, when the latch circuit 25 is reset, it is necessary to forcibly block the input voltage to the switching power source device or to wait until the control power voltage Vcc decreases to the operation stop voltage UVLO-off or lower as the result of the discharging of the capacitor C.

However, since the capacity of the capacitor C is relatively large as described above, the discharging naturally takes a long time. Moreover, the discharging of the capacitor C during the latch protection operation depends on the consumption current of the IC control block 22 that is designed to consume less power. Therefore, it takes a long time to reset the latch circuit 25, and it is necessary to reactivate the control circuit 20. As a result, the reactivation time naturally increases.

The present invention is directed to provide a switching power source device capable of shortening the reactivation time during the latch protection operation.

Means to Solve the Problems

According to one aspect of the present invention, a switching power source device includes: a switching power supply main body that switches an input voltage via a switching element such as an IGBT or a MOSFET to obtain a predetermined DC output voltage; a control circuit that performs on/off-driving of the switching element; and a capacitor that is connected to the control circuit to be charged by an external power supply via an activation switch circuit during activation and that is charged by a voltage generated in the switching power supply main body after completion of activation to supply a control power voltage to the control circuit, the control circuit including: a latch circuit that is set according to a latch signal emitted when an abnormality is detected to stop the driving of the switching element; a discharge circuit that receives the latch signal to be turned and discharges charges accumulated in the capacitor; and a comparator that resets the latch circuit when the control power voltage decreases to an operation stop voltage.

Specifically, the switching element switches an input voltage via a primary coil of a transformer to generate the DC output voltage on a secondary coil side of the transformer, and the capacitor supplies a voltage occurring in an auxiliary coil of the transformer to the control circuit as the control power voltage. Moreover, the discharge circuit is configured as a switch that receives the latch signal to be turned on and discharges the capacitor and that is turned off before the control power voltage decreases to the operation stop voltage of the control circuit to stop the discharging of the capacitor.

The capacitor is externally attached to a control power terminal of the control circuit which is an integrated circuit and has such a capacitance that a decrease in control power voltage during repeated charging/discharging of the capacitor in response to the stopped operation of the switching element is prevented.

According to the switching power source device having the configuration, after the latch circuit is set according to the latch signal emitted when an abnormality is detected to forcibly stop the switching operation of the switching element, when the comparator detects a decrease in control power voltage to reactivate the control circuit, the charges in the capacitor are discharged in advance through the discharge circuit according to the latch signal. Thus, even when a standby current of the control circuit in the period in which the switching operation of the switching element is stopped is small and it takes a long time to discharge the capacitor via the control circuit, it is possible to quickly decrease the charging voltage (that is, the control power voltage) of the capacitor.

As a result, the time required for the comparator to detect a decrease in control power voltage and to reset the latch circuit decreases, and the time (reactivation time) required for the switching operation of the switching element to start based on the reactivation after the latch protection operation starts can be shortened. Therefore, it is possible to shorten the reactivation time during the latch protection operation and to decrease the power consumption of the control circuit as much as possible. As a result, it is possible to improve the efficiency of the power supply and to reduce the power consumption during standby. Thus, the switching power source device has many practical advantages.

DETAILED DESCRIPTION

Hereinafter, a switching power source device according to an embodiment of the present invention will be described with reference to the drawings.

Figure 1:
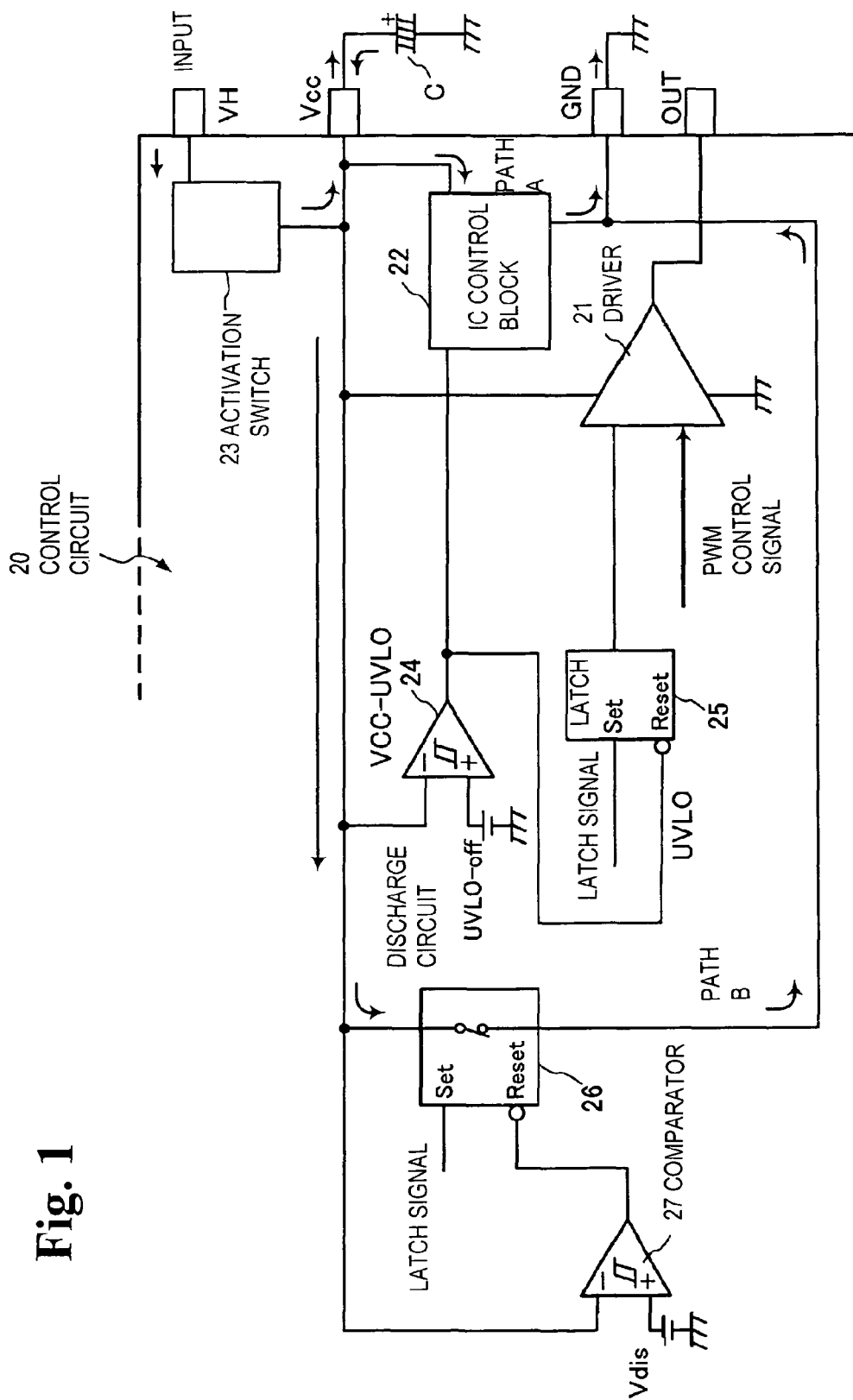
FIG. 1 is a diagram illustrating a schematic configuration of a control circuit of a switching power source device according to an embodiment of the present invention.
Figure 3:
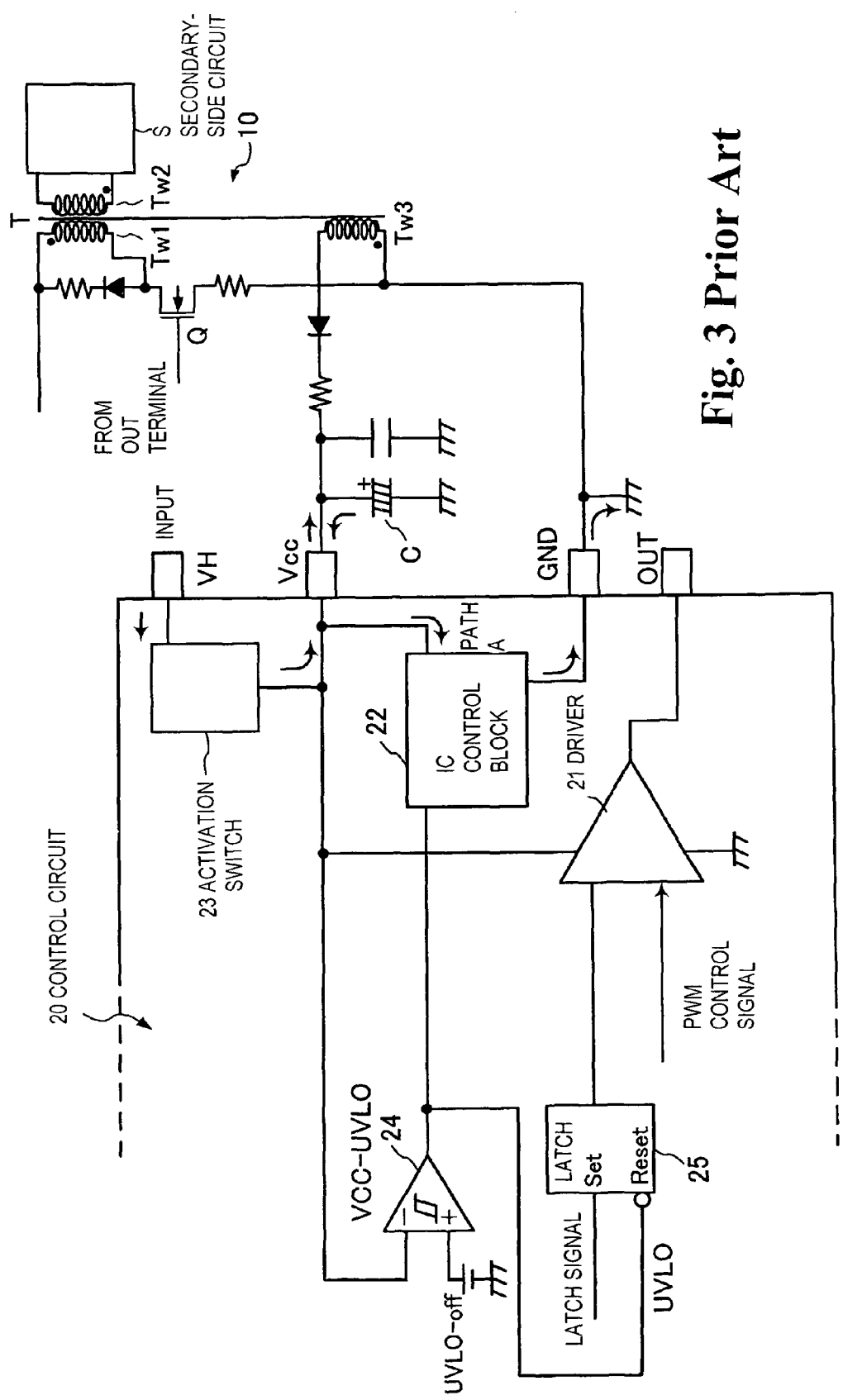
FIG. 3 is a diagram illustrating a schematic configuration of the switching power source device.
Figure 4:
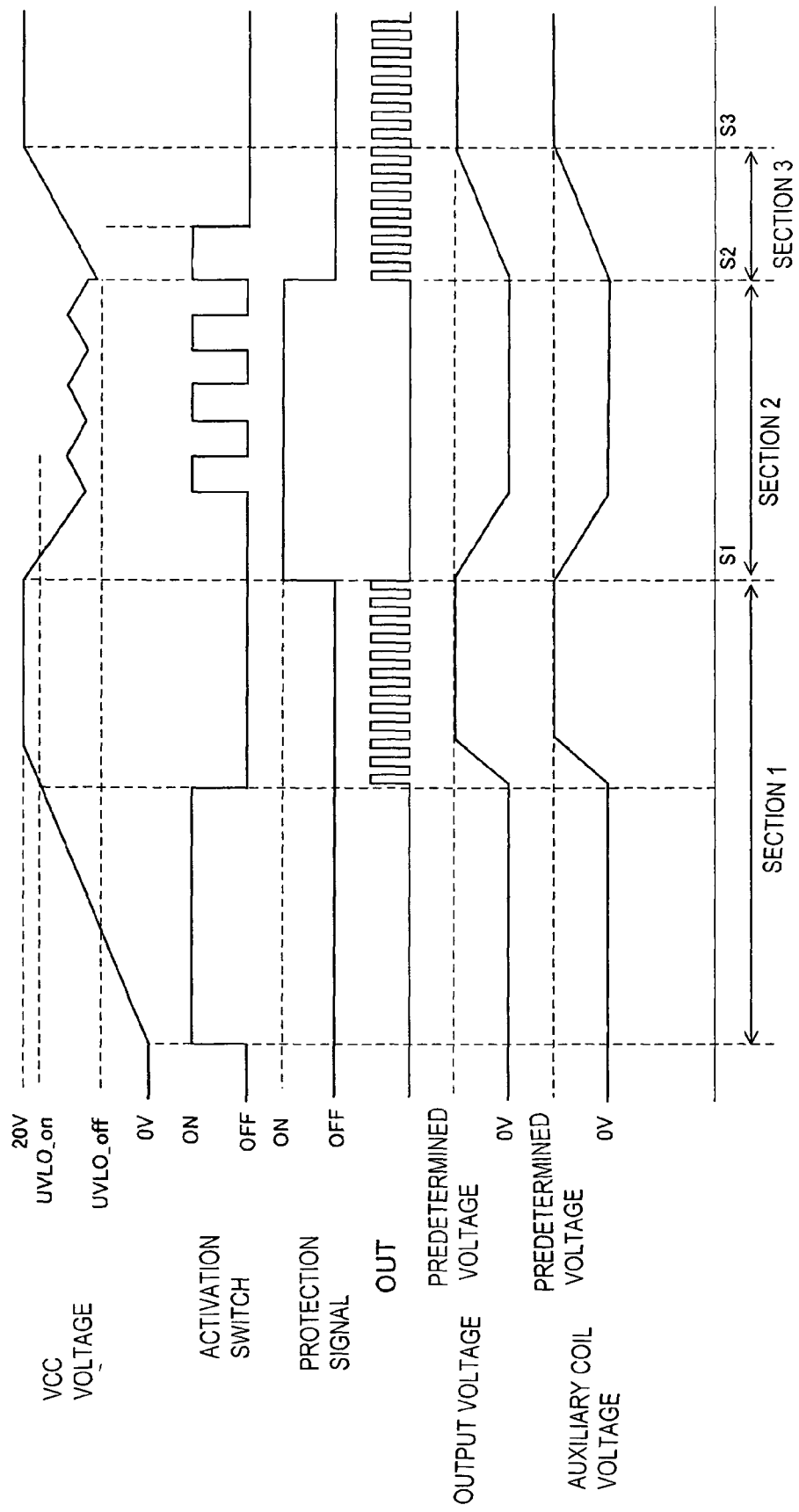
FIG. 4 is a timing chart illustrating the operation of the switching power source device during activation.
Figure 5:
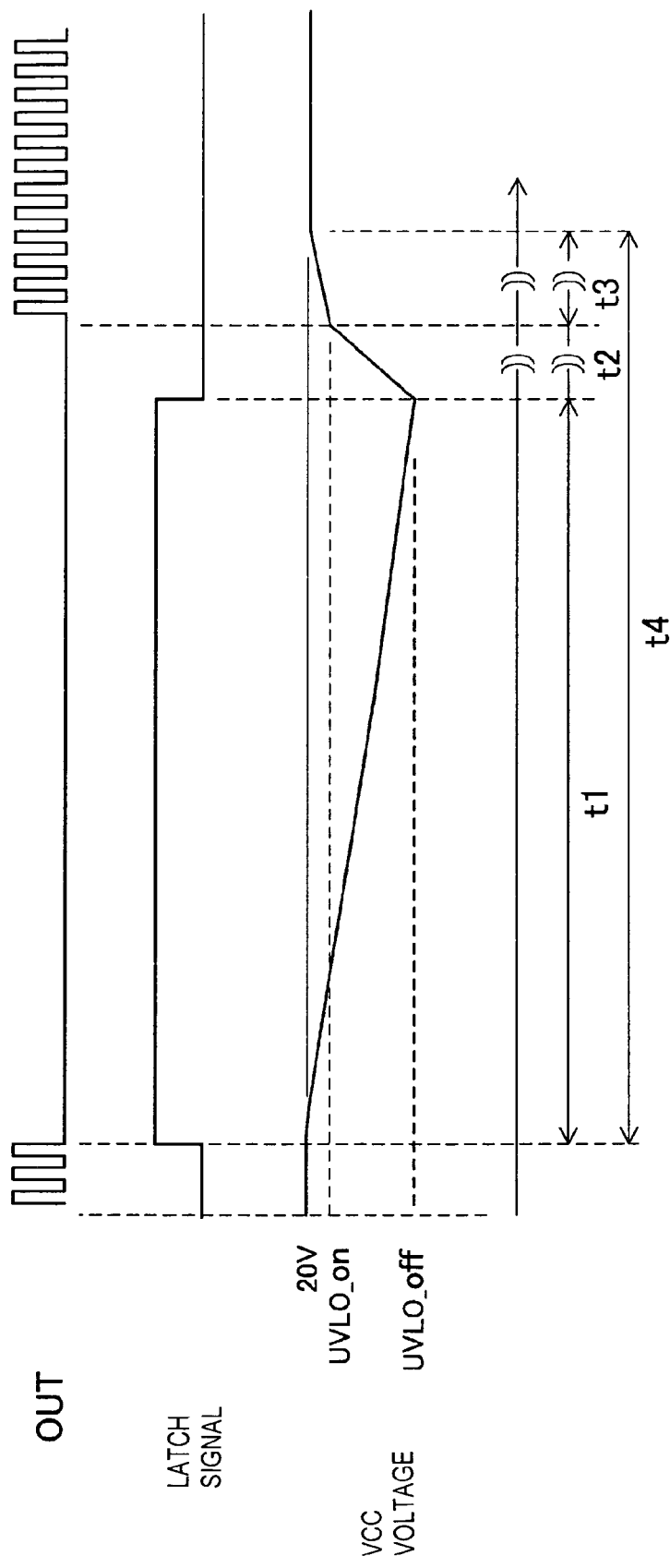
FIG. 5 is a timing chart illustrating the operation during latch protection and unlatching of the switching power source device illustrated in FIG. 3.

FIG. 1 is a diagram illustrating a schematic configuration of a main part of a switching power source device according to an embodiment of the present invention, in which the same portions as those of the conventional device illustrated in FIG. 3 are denoted by the same reference numerals. The switching power source device includes a discharge circuit 26 that is connected to the power terminal VCC to discharge the charges accumulated in the capacitor C when the latch signal for setting the latch circuit 25 is input. Moreover, the switching power source device further includes a comparator 27 that compares the power voltage Vcc applied to the power terminal VCC with a predetermined discharge threshold voltage Vdis and resets the discharge circuit 26 when the power voltage Vcc decreases to the discharge threshold voltage Vdis.

Figure 2:
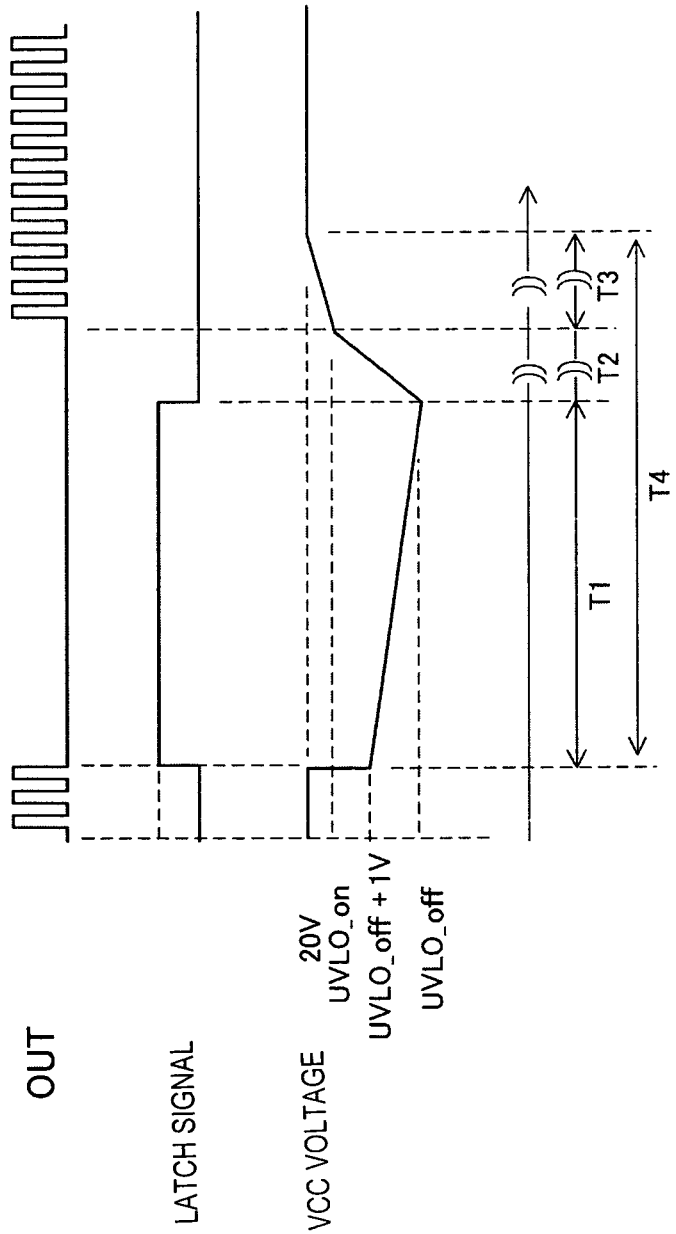
FIG. 2 is a timing chart illustrating the operation of the control circuit illustrated in FIG. 1.

The discharge threshold voltage Vdis set to the comparator 27 is set to be approximately 1 V higher than the operation stop voltage UVLO-off, for example. Thus, as illustrated in FIG. 2 illustrating the operation timing of the discharge circuit 26, the discharge circuit 26 is turned off after forcibly discharging the charges accumulated in the capacitor C under the control of the comparator 27 at the timing when the latch signal until is input, the control power voltage Vcc decreases to the discharge threshold voltage Vdis. After that, the charges accumulated in the capacitor C are drawn out according to a standby consumption current flowing in the IC control block 22, and the control power voltage Vcc further decreases from the discharge threshold voltage Vdis with the discharging of the capacitor C (see Period T1 in FIG. 2).

When the control power voltage Vcc has decreased to the operation stop voltage UVLO-off, the latch circuit 25 is reset in response to the output of the low-voltage protection comparator 24 that detects this state, and thereby the stopped operation of the driver circuit 21 is resumed. At the same time, the output of the comparator 24 is applied to the IC control block 22, the activation switch circuit 23 is turned on (conductive), and the capacitor C is charged again by an external power supply (see Period T2 in FIG. 2).

When the voltage (the control power voltage Vcc) of the control power terminal VCC has reached the operation start voltage UVLO-on with the charging of the capacitor C, the IC control block 22 starts operating, and the driver circuit 21 is driven again under the control of the IC control block 22, and thereby the switching element Q starts the switching operation (see Period T3 in FIG. 2). After that, the switching power source device returns to a normal operation.

Here, the reactivation time required for returning to the normal operation based on the releasing of the latch protection operation after the switching operation is stopped in response to the input of the latch signal will be discussed. The reactivation time is the sum of a period T1 required for discharging the capacitor C, an initial charging period T2 of the capacitor C by the activation switch circuit 23, and a period T3 required for the predetermined control power voltage Vcc to be stably obtained after the switching operation of the switching element Q starts.

The period T2 depends on the ability of the activation switch circuit 23 to charge the capacitor C. The period T3 depends on the specifications of the switching power source device (in particular, the operation specifications of the switching element Q). The sum of these periods T2 and T3 is generally approximately 1.5 seconds. In order to increase the charging current to the capacitor C, it is necessary to increase the current capacity of the constituent elements of the activation switch circuit 23.

On the other hand, the period T1 required for discharging the capacitor C depends on a standby consumption current of the IC control block 22 as described above. When the standby consumption current of the IC control block 22 is 300 µA and the capacitance of the capacitor C is 22 µF, the period T1 required for the control power voltage Vcc to decrease from 20 V which is the voltage before the latching stops to reach the operation stop voltage UVLO-off (for example, 10 V) is calculated as will be described below.

$$T1 = 22\ \mu F \times (20\ V - 10\ V)/0.3\ mA = 0.73\ second$$

Therefore, the reactivation time in the above-mentioned conditions is 2.23 seconds, and it is not possible to satisfy the demand that the reactivation time is to be shortened to 2 seconds or shorter.

In this respect, in the switching power source device having the above-described configuration, the discharge circuit 26 is operated at the timing when the latch signal is input. The charges accumulated in the capacitor C are forcibly discharged through the discharge circuit 26, whereby the control power voltage Vcc is forcibly decreased to a voltage that is 1 V higher than the operation stop voltage UVLO-off, for example.

Thus, the period T1 required for the control power voltage Vcc to decrease to the operation stop voltage UVLO-off (for example, 10 V) when the capacitor C is discharged by the current drawn out according to the standby consumption current of the IC control block 22 is calculated as will be described below.

$$T1 = 22\ \mu F \times (11\ V - 10\ V)/0.3\ mA = 0.073\ second$$

Therefore, the reactivation time in the above-mentioned conditions is 1.573 seconds, and it is possible to sufficiently satisfy the demand that the reactivation time during the latch protection operation is to be shortened to 2 seconds or shorter.

According to the switching power source device having the above-described configuration, it is possible to easily satisfy the demands for decreasing the power consumption in a standby state of the IC control block 22 and shortening the reactivation time from the latch protection operation, which are conventionally in a trade-off relation. Thus, the above-described configuration is very ideal in future for further decreasing the power consumption of the IC control block 22, improving power conversion efficiency of the switching power source device and decreasing standby power. In particular, the above-described configuration has many practical advantages in that it is possible to shorten the reactivation time with simple control that involves forcibly discharging the charges in the capacitor C using the discharge circuit 26 to shorten the time required for the control power voltage Vcc to decrease to the operation stop voltage UVLO-off.

The present invention is not limited to the above-mentioned embodiment. For example, the threshold voltage Vdis that determines the off timing of the discharge circuit 26 is not necessarily the voltage that is 1 V higher than the operation stop voltage UVLO-off but may be set according to the required operation specifications. In particular, it is sufficient that the threshold voltage Vdis is set to satisfy a lowest operation stop period of the latch protection operation and to satisfy the requirement for the reactivation time. Moreover, the present invention can be applied to various types of switching power source devices which have been hitherto proposed. Besides to this, the present invention can be modified in various ways without departing from the spirit of the present invention.

Explanation of Numerals
- Q: Switching Element
- T: Transformer
- C: Capacitor
- 10: Switching Power Supply Main Body
- 20: Control Circuit
- 21: Driver Circuit
- 22: IC Control Block
- 23: Activation Switch
- 24: Comparator (UVLO)
- 25: Latch Circuit
- 26: Discharge Circuit
- 27: Comparator

What is claimed is:

1. A switching power source device comprising:
   a switching power supply main body that switches an input voltage via a switching element to obtain a predetermined DC output voltage;
   a control circuit that performs on/off-driving of the switching element; and
   a capacitor that is connected to the control circuit to be charged by an external power supply via an activation switch circuit during activation and that is charged by a voltage generated in the switching power supply main body after completion of activation to supply a control power voltage to the control circuit, the control circuit comprising:
   a latch circuit that is set according to a latch signal emitted when an abnormality is detected, to stop the driving of the switching element;
   a discharge circuit that receives the latch signal to be turned on and discharges charges accumulated in the capacitor; and
   a comparator that resets the latch circuit when the control power voltage decreases to an operation stop voltage.

2. A switching power source device, comprising:
   a switching power supply main body that switches an input voltage via a switching element to obtain a predetermined DC output voltage;

a control circuit that performs on/off-driving of the switching element; and a capacitor that is connected to the control circuit to be charged by an external power supply via an activation switch circuit during activation and that is charged by a voltage generated in the switching power supply main body after completion of activation to supply a control power voltage to the control circuit, the control circuit comprising:

a latch circuit that is set according to a latch signal emitted when an abnormality is detected, to stop the driving of the switching element;

a discharge circuit that receives the latch signal to be turned on and discharges charges accumulated in the capacitor; and a comparator that resets the latch circuit when the control power voltage decreases to an operation stop voltage, wherein the discharge circuit comprises a switch that receives the latch signal to be turned on and discharges the capacitor and that is turned off before the control power voltage decreases to the operation stop voltage of the control circuit to stop the discharging of the capacitor.

3. The switching power source device according to claim 2, wherein the switching element switches an input voltage via a primary coil of a transformer to generate the DC output voltage on a secondary coil side of the transformer, and the capacitor supplies a voltage occurring in an auxiliary coil of the transformer to the control circuit as the control power voltage.

4. The switching power source device according to claim 2, wherein the capacitor is externally attached to a control power terminal of the control circuit which is an integrated circuit.

5. The switching power source device according to claim 1, further comprising another comparator connected to the capacitor and resetting the discharge circuit when a power voltage decreases to a discharge threshold voltage.

* * * * *